(No Model.)

H. LOWE.
CHECK BAR FOR BRIDLES.

No. 335,465.  Patented Feb. 2, 1886.

Witnesses:
P. H. Hinkley
Harlow W. Kemp

Inventor.
per, Harry Lowe
S. C. Shurtleff
Attorney.

UNITED STATES PATENT OFFICE.

HARRY LOWE, OF MONTPELIER, VERMONT.

CHECK-BAR FOR BRIDLES.

SPECIFICATION forming part of Letters Patent No. 335,465, dated February 2, 1886.

Application filed January 2, 1885. Serial No. 151,795. (No model.)

*To all whom it may concern:*

Be it known that I, HARRY LOWE, of Montpelier, in the county of Washington and State of Vermont, have invented a new and useful Improvement in a Check-Bar for an Overdraw-Check to a Bridle, which improvement is fully set forth in the following specification and accompanying drawings, in which—

Figure 1:
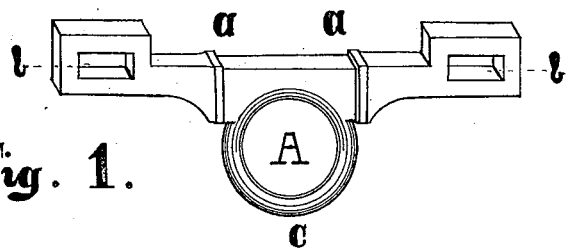
Figure 2:
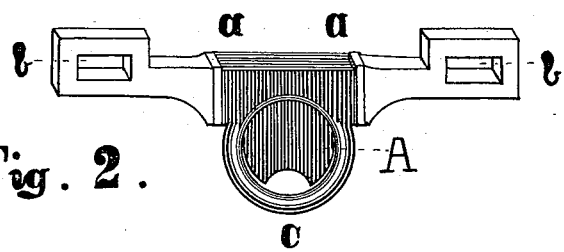
Figure 3:
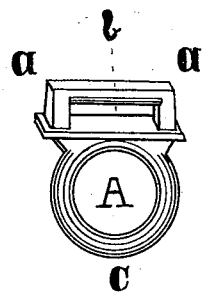

Figure 1 represents the metal part of a check-bar for double reins; Fig. 2, the same check-bar with the rubber attached, all complete. Fig. 3 represents the same invention when only one rein is used.

The object of my invention is to furnish a device by which an overdraw-check can be attached to the gig or bolt hook of the harness, that will not rattle or become unfastened when in use, and that will not wear or chafe the plating or finish from the gig or bolt hook of the harness.

In the drawings, A is the central ring, to be attached to the gig or bolt hook of the harness when in use. This ring, and the central portion of the bar as far each way from the center as the ring extends, is covered with soft rubber between the points $a\,a$. This rubber covering extends from the inside of the side of the ring of which the bar forms a part over so as to nearly fill the center of the ring A, but is detached from the rubber covering of the ring on the opposite side at $c$ for nearly half of the circumference of the ring, forming an elastic tongue within the ring. A circular notch is made in the end of the tongue, so that it will fit better to the gig or bolt hook of the harness. Near each end of the double bar $b$ is a loop to receive the reins. The rubber is securely fastened to the metal, so that it will not come off until worn out.

The bar may be made of any kind of metal, but preferably of steel, and each end, when not covered with rubber, may be plated with gold, silver, or nickel.

My check-bar is not confined to one for double reins. It is obvious that a check-bar for a single rein may be made in the same way.

Having thus described my invention, what I claim as new, and desire to secure by Letters Patent, is—

A check-bar for bridles, composed of a metal bar with a slot near each end for a check-rein, having a ring in the center attached to or formed on the shank of the bar, such ring and shank provided with a covering of soft rubber, and an elastic rubber tongue within the ring, attached to one side of the rubber covering of the ring and free at the other side, substantially as shown and described.

HARRY LOWE.

Witnesses:
P. H. HINKLEY,
HARLAN W. KEMP.